United States Patent [19]

Adler

[11] 4,189,786
[45] Feb. 19, 1980

[54] RADIO BUOY ASSEMBLY

[76] Inventor: Ronald E. Adler, 300 Chautauqua Blvd., Pacific Palisades, Calif. 90272

[21] Appl. No.: 206,528

[22] Filed: Jun. 29, 1962

[51] Int. Cl.² .................. H04B 1/59; B63B 21/52
[52] U.S. Cl. ................................. 367/4; 367/5; 367/133
[58] Field of Search ............... 9/8; 340/2, 4, 5, 6; 242/54, 85.1, 86.63, 86.64, 86.7, 99, 128

[56] References Cited

U.S. PATENT DOCUMENTS

| | | | |
|---|---|---|---|
| 347,241 | 8/1886 | High | 242/86.7 |
| 1,883,039 | 10/1932 | Snyder | 242/128 |
| 2,422,337 | 6/1947 | Chilowsky | 340/2 |
| 2,447,069 | 8/1948 | Holcomb, Jr. | 340/2 |
| 2,594,702 | 4/1952 | Woodard | 340/4 |
| 2,838,741 | 6/1958 | Mason | 340/2 |
| 2,973,918 | 3/1961 | Hancock | 242/99 |
| 2,981,927 | 4/1961 | McKenney | 340/2 |
| 3,066,325 | 12/1962 | Hayes | 340/2 |

Primary Examiner—Richard A. Farley
Attorney, Agent, or Firm—R. S. Sciascia; Sol Sheinbein

EXEMPLARY CLAIM

1. An apparatus comprising an intelligence capsule, a radio buoy, releasable means for retaining said buoy and said capsule attached together to be able to sink in sea water as a unit, pressure-responsive means for initiating release of said releasable means at a predetermined hydrostatic pressure, means for urging apart said buoy and capsule when said releasable means has been released;

said capsule including a free-flooded chamber; a frangible cap; said chamber being formed at least in part by said frangible cap; in said chamber, a subsurface float assembly comprising an inflatable float adapted to break and remove said cap upon inflation, a winch containing a line connected to said buoy, and a depth compensating dispenser for line connecting said capsule with said subsurface float assembly, said dispenser including means to restrain payment of line from said dispenser;

hydrostatic pressure responsive means, disabled from operation by said frangible cap, for activating said payment-restraining means, whereby said payment-restraining means is activated only upon removal of said frangible cap;

means responsive to a coded sonic signal for causing said winch to release said buoy to rise to the surface of water; and means for causing said winch to retract said buoy to a predetermined depth below the water surface.

6 Claims, 4 Drawing Figures

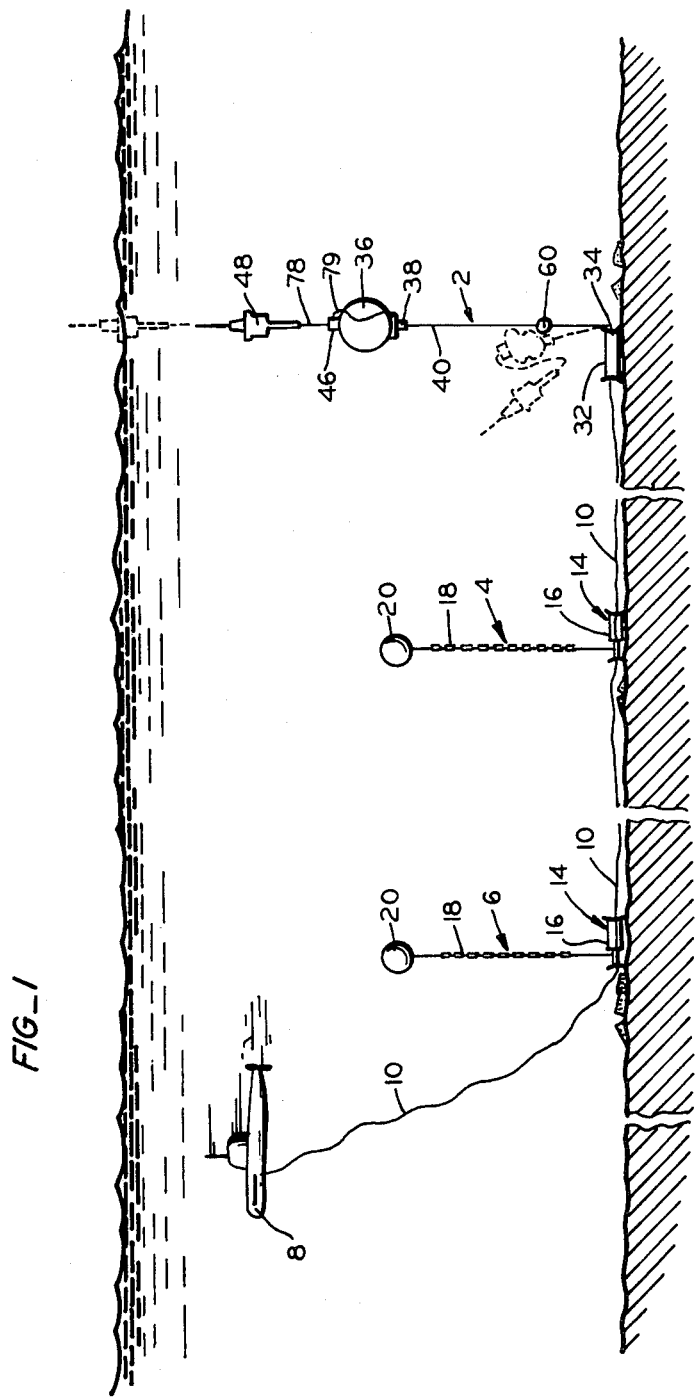
FIG_1

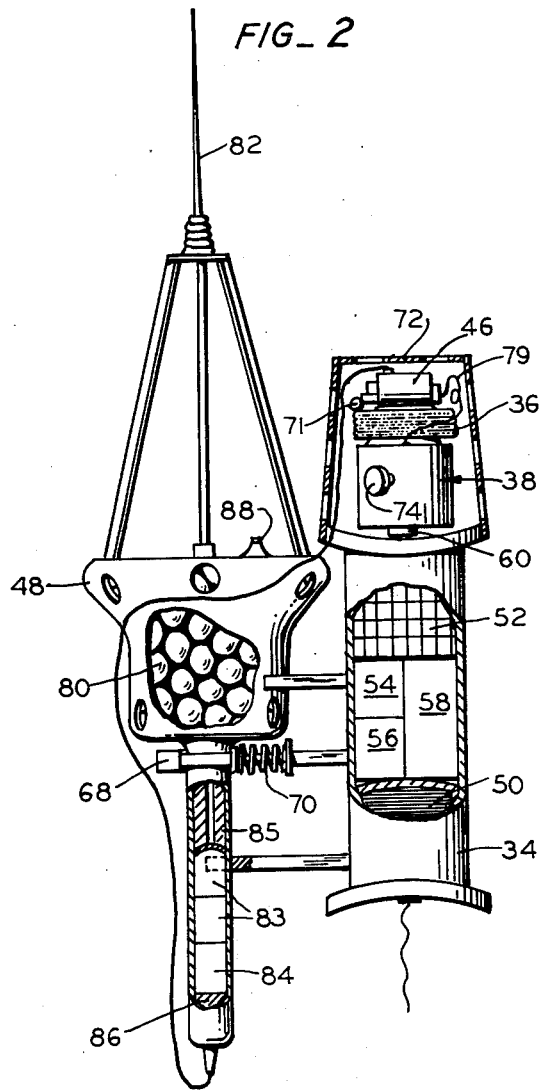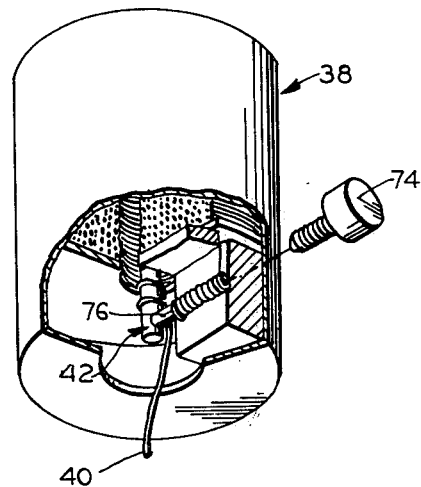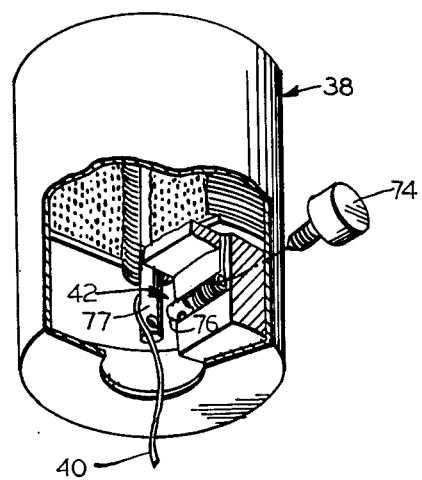

RADIO BUOY ASSEMBLY

The invention described herein may be manufactured and used by or for the Government of the United States of America for governmental purposes without the payment of any royalties thereon or therefor.

This invention relates to radio buoy assemblies and more particularly to a radio buoy assembly including an intelligence capsule containing equipment for recording information and transmitting it to a radio buoy and also serving to moor the buoy, and a winch for retracting the buoy below the surface of water.

An object of this invention is to provide a radio buoy assembly which can be compactly carried by a vessel for ready emplacement thereby.

Another object of the invention is to provide a radio buoy assembly including an intelligence capsule, serving as an anchor to moor the buoy, and containing equipment to record data and relay the data to the buoy for radio transmission, and including a subsurface float assembly comprising a winch for retracting the buoy below the surface of water.

A further object of the invention is to provide a radio buoy assembly in a radio buoy retained by a winch below the surface of water, released by the winch to rise to surface in response to a coded signal, and automatically retracted below the surface at a predetermined time.

Other objects and many of the attendant advantages of this invention will be readily appreciated as the same becomes better understood by reference to the following detailed description when considered in connection with the accompanying drawings wherein:

FIG. 1 is a schematic diagram of a preferred embodiment of the intelligence capsule and radio buoy assembly of the invention in deployed configuration shown in one useful employment as part of a detection barrier for detecting submarines;

FIG. 2 is a somewhat diagrammatic view partly broken away of the intelligence capsule and radio buoy assembly of FIG. 1 packed for emplacement; and FIG. 3 (composed of 3a and 3b) illustrates diagrammatic views, partly broken away, showing in detail the wire dispenser of the subsurface float assembly of the invention with a schematic connection between a pressure-responsive control and a tangler mechanism controlled thereby.

This invention involves a radio buoy assembly comprising a radio buoy connected to a subsurface float assembly, which includes a winch to control the position of the buoy, and an intelligence capsule serving as an anchor to moor the radio buoy and containing equipment for receiving data, recording them, and relaying them to the radio buoy for transmission by radio from the radio buoy, the entire apparatus, when deployed, constituting an intelligence station. The invention is of general utility in organizations where its functions are needed, but it is especially useful as a component in detection barriers for detecting submarines in systems of the type set forth in my copending application entitled "Submarine Detection System", Ser. No. 206,523, filed June 29, 1962.

Reference is now made to the drawings. In FIG. 1 is shown a preferred embodiment of the invention in deployed configuration constituting a component of one type of detection barrier or line for detecting submarines. This barrier comprises a series of bottom-moored stations 2, 4, 6, etc., which are established by capsules that are dropped automatically from a slow-moving submarine 8. Each capsule is connected to its adjacent capsule by an insulated single-conductor wire 10. The connecting wire is carried on the submarine in separate wire dispensers fixed to the submarine, with essentially the amount of wire in each dispenser equal to the length of the base-line spacing, nominally 10 miles in a typical situation.

There are two types of capsules: detection capsules and intelligence capsules. The detection capsule 14 is the passive detector. Its steel case 16 serves as an anchor, and houses, for example, a 250-foot hydrophone array 18, an inflatable subsurface rubber float 20, a battery supply for, say, 90-day operation, two small self-contained drop wire dispensers, a carrier oscillator, and a hybrid repeater amplifier. Most of the individual elements which can be used to construct components of the illustrated barrier, including apparatus according to this invention, and the specific arrangements available for interconnecting them according to the principles of the invention are known or are within the skill of the art and form no part of this invention and, hence, are illustrated in the drawings schematically, often by blocks. Depending upon the location and water conditions, there are up to, say, twenty detection capsules in a complete barrier line, thus providing a nominal line coverage of, say, 200 miles.

At least one but preferably two intelligence capsules of this invention—one at each end—are connected to the string of detection capsules. The intelligence capsules 32 also has a steel anchor-shaped case 34, but unlike the detection capsule, it carries no hydrophone array. Instead, it houses a larger inflatable subsurface float 36 that supports a wire dispenser 38, holding up to, say, 6000 feet of insulated cable 40 covered by plow steel wire. A pressure-actuated wire tangler 42 (FIG. 3) locks the subsurface float 36 at the desired depth as the float ascends. A small battery-driven winch 46 with, say, 100 feet of similar cable is on the upper side of the float. This cable runs to a small UHF radio buoy 48 which, upon receipt of a properly coded signal, is allowed to float to the surface and transmit compressed-time data. The radio buoy is then pulled back down to, say, 30 feet below the surface by the battery-powered winch.

The intelligence capsule contains a single, small wire dispenser 50, a battery supply 52, an amplifier 54, a winch-control receiver 56, and a tape recorder 58, which records the sonic signal arriving on the separate carrier from each detection capsule at real time for, say, 57 1 minutes and plays it back at high speed in, say, 3 minutes (19:1 time compression). This high-speed playback of the detection data is fed to the radio buoy for useful transmission by radio from the radio buoy in the event that the radio buoy is at the surface of the water at the time of the playback. The tape recorder operates continuously in, then, one-hour self-timed cycles, erasing the tape before each new recording cycle. Thus, a signal from each of the, say, twenty detection capsules is simultaneously fed to the intelligence capsules on each end of the string via the wire link and sea water return. The identical sonic data are recorded and played back by each of the two intelligence capsules every hour. However, to make it difficult for the enemy to locate the barrier, each intelligence capsule is interrogated, say, only every two hours and then only on condition that the radio buoy will not be under enemy observation.

To call up the radio buoy, an aircraft carrying signal processing equipment drops a small, low-power-level, coded, explosive signal charge near the intelligence station to be interrogated. The coded explosive signal, picked up by a small hydrophone 60 disposed, for example, slightly above the intelligence capsule, actuates the winch-control receiver, releasing the radio buoy which quickly floats to the surface (in a few seconds).

Another method of collecting the stored sonic data is to have a submarine or surface vessel transmit a coded train of pings with its active sonar. Like the coded explosive signal charge, these pings actuate the winch release at the intelligence station. Again the radio buoy floats to the surface and, as automatic playback occurs, makes its UHF radio transmission to the submarine which must expose only its small UHF mast. In this case, the submarine carries signal processing equipment similar to that carried in the aircraft.

Summarizing, the system employs a number of submarine-laid, moored, vertical-array detectors to collect and then transmit sonic data to two intelligence capsules—one on each end. The data from each channel are recorded in real time and, upon command, are transmitted in compressed time to an aircraft or ship via a UHF radio link for signal processing and comparison with visual or radar targets.

TIMING CYCLE

Maximum laying speed for the barrier in which the intelligence capsule of this invention is shown as a component is determined by the use of a wire payout rate that does not cause fouling in the screws of the submarine from which the barrier is preferably emplaced.

To insure reliability of the electronic components, it is preferred to energize all electronic equipment within each capsule prior to starting emplacement of the barrier. For example, a direct current pulse can be used for this purpose and can be supplied from within the submarine by a conventional disconnectible electrical umbilical cord. This facilitates final system checkout of the equipment before emplacement while still carried on a submarine.

The interrogation cycle is typically started by the dropping of a coded charge from aircraft at one intelligence station and shortly thereafter receiving recorded sonic data therefrom. At, say, an hour later, the aircraft drops a coded charge at the other intelligence station at the other end of the barrier line. This process can be continued throughout the life of the barrier or just for the period that the sonic information is desired.

A complete recording-playback cycle takes, say, 60 minutes—57 minutes for recording and 3 minutes for playback. This 60-minute cycle remains constant. It is established by the constant speed of the recorder's motors and the length of tape in the recorder.

The length of time the radio buoy remains above the surface is determined by the amount of time before playback that the coded charge is dropped by the aircraft. As soon as playback is completed, the recorder signals the winch control to lower the buoy, if it has been raised.

The coded charge should be dropped at least one minute before playback starts to give the buoy time to float to the surface.

If the aircraft drops the coded charge 5 minutes before playback as a safety factor, the buoy is visible only 8 minutes out of a 120-minute period. As the proficiency of the aircraft improves with experience, it becomes possible to keep the buoy submerged close to the maximum of 117 minutes out of the 120-minute period.

After the system is initially started, the dropping of a coded charge affects only one thing—the position of the radio buoy which rises to the surface when the correct coded charge is dropped. The playback of the sonic data can be recorded by the aircraft only, of course, when the antenna of the buoy is above the surface.

Once the recording cycle has been started in an intelligence capsule, that capsule can be interrogated not more than, say, once an hour. In normal operations each capsule on a barrier is interrogated, say, once every two hours. This is done to enhance the concealment of the capsule's location.

Each capsule plays back its information for transmission by the radio buoy, if it is surfaced, only at times that are multiples of 60 minutes from the start of the first playback.

If the first coded charge is dropped at 1308 hours, the capsule begins recording at this point; 57 minutes later, at 1405, the capsule begins playback, and will begin playback every 5 minutes after the hour thereafter. Thus, if the aircraft misses one or more interrogation periods for any reason, it can resume interrogation of the capsule by dropping a coded charge a minute or two before the closest playback time (in this example five minutes past any hour) that it can fly over the intelligence capsule.

Briefly, the system operation is as follows. Sonic signals (of 50–250 cps) are picked up in a detection capsule by the hydrophone array, passed through a single preamplifier, and then modulated onto an individual carrier.

The signal and individual carrier from each detection capsule are boosted by a hybrid telephone-type repeater in each capsule. This repeater maintains the balance of signal strength at the recorder by amplifying the signals which are attenuated over the typical 10-mile length of wire between two adjacent capsules. The signal and carrier from each capsule are fed via wire link to the intelligence capsule where they are recorded on a single channel recorder. At playback, the recorded signals and carriers are passed through a broadband amplifier, then through coaxial cable in the line to the radio buoy, where they are transmitted, preferably redundantly by two solid state transmitters.

The signal is received in the aircraft on preferably two redundant receivers, filtered, and fed into the signal processing equipment for analysis. This signal processing equipment may be one of several currently in use. However, a preferred equipment is one which (1) separates from the radio signal the data received from each detection station and places it in an individual channel, (2) spectrum-analyzes the sonic signal from all such channels for detection and classification of the target, (3) cross correlates data from selected pairs of barrier detectors to determine target location, and (4) presents for interpretation the results of the cross correlation and of the spectrum analysis, the latter as a time versus frequency plot, and the former as a position versus time plot.

INTELLIGENCE CAPSULE

As previously noted, there are two intelligence capsules in a barrier line of the type shown to illustrate one use of this invention—one at each end. However, only one capsule is necessary for the system to function. Each intelligence capsule is, say, about five miles from the nearest detection capsule; both intelligence capsules are simultaneously fed sonic data from all detector capsules. If a segment of the wire link between detection capsules is broken, the barrier continues to function, in effect, as two individual systems.

FIG. 2 shows the intelligence capsule and the radio buoy in piggy-back position. They are dropped from the submarine in the married condition. After the pressure-responsive release 68 triggers, a powerful spring 70 separates the two. Later, the pressure-time actuator 71 inside the dome 72 of the capsule triggers and inflates the subsurface float 36, breaking off the frangible plastic dome. The plastic dome may be mounted on the capsule in such a manner (e.g. friction fit) as to be capable of being pushed off the capsule by expansion of the float. If the dome is both frangible and mounted for push-off by inflation of the float, this provides double insurance that the float assembly will be freed from the capsule. The float 36 rises slowly, paying out plow steel wire containing an interior insulated coaxial cable from the wire dispenser 38 fixed to and carried under the float. The small electric winch 46 and the radio buoy 48 on top of the float are also carried upward. When the float, gradually inflating, slowly rises to a predetermined depth of, say, 100 feet a pressure-responsive control device 74 (kept "on safe" when the dome is in place on the capsule) is triggered. As indicated in FIG. 3, this projects a tangler pin 76 into the core 77 of the dispenser, tangling the wire and stopping further ascent of the subsurface float. The small electric winch 46 holds the radio buoy 48 below the surface. The coaxial line 40 from the intelligence capsule at the bottom to the subsurface is referred to as the taut line and the coaxial line 78 from the subsurface float to the radio buoy is called the slack line. To complete the continuity between capsule 32 and buoy 48, coaxial line 79 is used. Part of the wire link between the intelligence and detection capsules is carried in the small drop wire dispenser 50 in the intelligence capsule. This small dispenser, similar to the dispensers in the detection capsule, contains a maximum of 6000 feet of cable.

Radio Buoy

The radio buoy, when released by the electric winch, will rapidly rise to the surface under its own positive buoyancy and pull out excess cable from the winch. With this slack line, it then becomes a nearly free-floating buoy. The barrier is placed so that excessive winds and surface currents acting on the radio buoy will not be great enough to cause it to be towed under.

Thin walled and free flooding, the radio buoy houses closely packed hollow glass spheres which can withstand very high hydrostatic pressures. They are coated with polyethelene to make them scratch resistant. On top of the inverted bell-shaped tank is a short UHF whip antenna 82. Two antennas are optional if two redundant solid state transmitters 83 are used. Each would then broadcast the same transmission simultaneously at offset center frequencies. Batteries 84 supply the transmitters. The UHF transmission will be picked up easily by aircraft flying at 8000 feet, but it will reach to only about 11 miles range along the surface.

Material 85 of the proper density, such, for example, as solid lithium metal float canisters fill the narrower portions of the float and aid in shifting the center of gravity lower in the float. The center of buoyancy is high, making for a more stable float. Stability is aided by a stabilizing weight 86. The aforedescribed radio buoy structure of this invention is capable of withstanding high hydrostatic pressures and still is of low inertia. The float is tethered by a slack line to the winch and is free to ride the wave crests. Since the mass of the float is low compared to its total submerged buoyancy, then it responds quickly to the dynamic lifting action of the waves.

Any suitable means can be used to transmit a "stop winching down" order to the electric winch control when the buoy is, say, 30 feet below the surface. For example, a mechanical stop can be used to stop the winch such as a plug on the slack line between the radio buoy and the winch which hits an arm to apply a brake or pawl to the winch and simultaneously cut off electrical power to the winch. A subsequent coded sonic signal releases the brake. Battery power for the winch comes from batteries in the intelligence capsule.

Recorder

A single-channel recorder 58 is located in the pressure tank compartment of the intelligence capsule. This may be a ¼-inch tape device with the erase head in front of the record head, and a standard playback head. Its drive motors have precision speed control. Motors for record and playback are switched by metallic strips on the mylar tape. The playback is in the reverse direction of the record direction. A 7½-inches-per-second tape record speed for 57 minutes can handle the information bandwidth of 4 kc plus the carrier bandwidth. Playback is at 142.5 inches per second for 3 minutes. The lowering of the radio buoy after playback is triggered by the recorder timing. The recorder, statically located at the ocean bottom in a capsule, does not suffer the gyrations and accelerations of a recorder in a surface buoy. This reduces the wow and flutter and enhances the final signal processing.

Wire Link

The wire link between capsules in the system illustrated to show a use of this invention is satisfactorily achieved with components available in the art. Single conductor copper wire is available which provides adequate strength and transmission characteristics for the several modulated carriers from the detection capsules. Tangling of lines is avoided because extra wire in each dispenser provides a slack wire to any unexpected wire loads.

WINCH CONTROL RECEIVER AND HYDROPHONE

As previously mentioned, the radio buoy can be called to the surface by a coded sonic signal emanating from an active sonar or coded explosive charge. A typical coded signal charge produces a frequency-coded train of pulses received at the intelligence station by a single hydrophone 60 (preferably placed at a short distance from the bottom). The pulse train is fed to the receiver 56 which responds with a "yes" or "no" response. If it is the required signal, then a command is sent to the winch control, releasing the brake on the electric winch, allowing the radio buoy to quickly rise to the surface. This receiver's circuit characteristics and coding are tailored to the capabilities of the coded explosive signal charge.

CODED SIGNAL CHARGE

The winch mechanism controlling the radio buoy is, in effect, triggered by the specific sound pattern produced by a coded explosive charge designed to provide a signal of predetermined magnitude and duration. The code can be selected from a large variety of pulse combinations. The selected code, when received by a special filter network, provides the combination of sound patterns to actuate the winch mechanism. Any sound source of different character, released either accidentally or purposely, cannot trigger the winch.

The relative simplicity and low energy level required for the coded explosive signal charge make it possible to use a low cost and highly reliable explosive charge that can be directly dropped from an aircraft and detonated at a predetermined depth to actuate the winch.

SUBMARINE INSTALLATION

The complete illustrated system package including the intelligence capsule of this invention is mounted on a rack on the outer hull of a submarine. The units are interconnected by wire while on the submarine. Wire dispensers are permanently fastened to the submarine's mounting rack, and the intelligence and detection capsules are held in place by mechanical linkages with hydraulic boost. With the exception of the linkage for the first intelligence capsule, which is tripped by an operator in the submarine, these linkages are automatically tripped by a nylon lanyard fastened to the last few yards of wire in each submarine wire dispenser. This enables the submarine to proceed uninterrupted along the barrier line, with the spacing between capsules controlled by the length of wire wound in each dispenser. After its linkage is tripped, each capsule falls by gravity, and wire pays out from both the submarine-carried wire dispenser and the small dispenser in the capsule.

Automatic mooring takes place as previously described. Experience has indicated that when more than one wire is connected to a device during deep mooring, the wires often tangle. The time delay in the deploying of floats according to this invention allows the wires to settle on the bottom before the floatation gear is released. Some tangling is expected in normal operation, but the excess wire in the capsule dispensers prevents breakage.

Obviously many modifications and variations of the present invention are possible in the light of the above teachings. It is therefore to be understood that within the scope of the appended claims, the invention can be practiced otherwise than as specifically described.

What is claimed is:

1. An apparatus comprising an intelligence capsule, a radio buoy, releasable means for retaining said buoy and said capsule attached together to be able to sink in sea water as a unit, pressure-responsive means for initiating release of said releasable means at a predetermined hydrostatic pressure, means for urging apart said buoy and capsule when said releasable means has been released;

said capsule including a free-flooded chamber; a frangible cap; said chamber being formed at least in part by said frangible cap; in said chamber, a subsurface float assembly comprising an inflatable float adapted to break and remove said cap upon inflation, a winch containing a line connected to said buoy, and a depth compensating dispenser for line connecting said capsule with said subsurface float assembly, said dispenser including means to restrain payment of line from said dispenser;

hydrostatic pressure responsive means, disabled from operation by said frangible cap, for activating said payment-restraining means, whereby said payment-restraining means is activated only upon removal of said frangible cap;

means responsive to a coded sonic signal for causing said winch to release said buoy to rise to the surface of water; and means for causing said winch to retract said buoy to a predetermined depth below the water surface.

2. The apparatus of claim 1 wherein said last named means operates on a predetermined absolute time cycle to cause automatic retraction of said buoy at times independent of the rising of the buoy to the water surface.

3. The apparatus of claim 1 wherein the buoy comprises a free-flooding chamber containing for buoyancy a plurality of hollow glass spheres.

4. The apparatus of claim 1 wherein said capsule includes a line dispenser to facilitate, without risk of breaking the line, relative displacement of said capsule and another body which is connected thereto by line, part of which is in said dispenser.

5. The apparatus of claim 1 wherein said capsule includes projections to engage the bottom of a body of water in the manner of an anchor to assist in mooring said apparatus.

6. The apparatus of claim 5 further including means operable at a predetermined time to cause said winch to retract said buoy to a predetermined distance below the surface of said water.

* * * * *